United States Patent
Maddox

(10) Patent No.: US 6,526,691 B1
(45) Date of Patent: Mar. 4, 2003

(54) COMBINATION FISHING ACCESSORY

(76) Inventor: John M. Maddox, 436 McMillan Rd., Ochlocknee, GA (US) 31773

( * ) Notice: Subject to any disclaimer, the term of this patent is extended or adjusted under 35 U.S.C. 154(b) by 0 days.

(21) Appl. No.: 09/952,771

(22) Filed: Sep. 14, 2001

(51) Int. Cl.$^7$ .............................................. A01K 97/00
(52) U.S. Cl. ...................................................... 43/53.5
(58) Field of Search ........................... 43/53.5, 5, 47.2; 29/243.56

(56) References Cited

U.S. PATENT DOCUMENTS

| | | | |
|---|---|---|---|
| 143,610 A | | 10/1873 | McDonald |
| 765,605 A | * | 7/1904 | Wade |
| 2,469,699 A | * | 5/1949 | Mundy ........................... 43/29 |
| 2,537,879 A | | 1/1951 | Culhane, Jr. |
| 2,795,887 A | | 6/1957 | Lockert |
| 2,847,793 A | | 8/1958 | Breer |
| 3,001,320 A | | 9/1961 | Sonner, Jr. |
| 4,342,171 A | | 8/1982 | Cripps et al. |
| 4,590,702 A | | 5/1986 | Chestnutt |
| 4,833,817 A | | 5/1989 | Silverthorn |
| 5,084,999 A | * | 2/1992 | Henry ........................... 43/53.5 |
| 5,348,296 A | | 9/1994 | Frederiksen |
| 5,407,197 A | | 4/1995 | Parsons |
| 5,733,195 A | | 3/1998 | Wall |
| 5,938,532 A | | 8/1999 | Wall |
| 6,272,788 B1 | * | 8/2001 | Bergacker ................... 43/53.5 |

* cited by examiner

*Primary Examiner*—Charles T. Jordan
*Assistant Examiner*—Bret Hayes
(74) *Attorney, Agent, or Firm*—Brian D. Bellamy

(57) ABSTRACT

A fishing accessory providing a combination fish club for dispatching a fish, gaffing a fish, or extracting a hook from a fish. The club includes an elongate rod having sufficient length and weight for striking and dispatching a fish. A handle is located on one end of the elongate rod for gripping the club, and an angular tip is located on the opposite end of the rod to provide a useful tool in extracting a hook or gaffing a fish. A receiving slot is formed in the angular tip with an open end for receiving a fishing line or fish hook. A pair of diametrically opposed grasping members are formed in the angularly tapered walls of the angular tip with projecting edge oriented toward the handle such that the grasping members may be used for extracting a fish hook from the throat of a fish or gaffing a fish.

5 Claims, 1 Drawing Sheet

COMBINATION FISHING ACCESSORY

BACKGROUND OF THE INVENTION

1. Field of the Invention

The present invention relates to fishing and clubs and other accessories used in dispatching and gaffing of fish and extracting hooks from fish. In particularly, the present invention relates to a unique device providing a combination accessory for dispatching a fish, gaffing a fish, or extracting a hook from a fish.

2. Description of the Prior Art

In fishing, especially saltwater fishing, clubs are used in stunning or killing a fish to dispatch the fish prior to landing the fish onto a boat. Further, once a fish is dispatched there is a need to gaff the fish and pull the fish onto the deck of the boat. Once the fish is on the boat, a further need exists to remove the hook from the fish's throat.

A large fish can be dangerous when trying to place the fish onto the deck of a boat. A large fish does not weigh much when submerged within the water because the buoyancy effect of the water actually makes the fish almost weightless when in the water. However, the full weight of the fish must be contended with once it is out of the water. It can be readily appreciated that a large fish of great weight such as 25 to 100 pounds cannot easily be lifted out of the water and into the boat. The posture of the person attempting the task adds to its difficulty. The person is usually leaning over the railing of the boat precariously without the ability to a good position for lifting. The lashing about of the fish further makes the task difficult. The fish might lash about and possibly stab a fisherman with the spine of his fin or come loose and be lost after much effort. Fish can be very heavy and difficult to handle while hanging on the line with a hook in the fish's mouth, especially if the fish is moving violently.

Once a large fish is safely brought up out of the water and into a boat, other problems arise. Since the fish is alive and large, its natural survival instincts are to continue to move about which sometimes causes the fish to jump out of the boat back into the water. The violently moving fish can also be a danger to the people within the boat, possibly causing a person to be thrown overboard or possibly causing physical injuries due to sharp teeth, sharp fins, sharp gills, and sharp scales.

After a fish has been caught by using a fish hook, it is desirable to extract and recover the fish hook which may be lodged in the lip, mouth, or deep in the throat of the fish. However, this can be a difficult as well as dangerous task. Both the hook and the fish are potentially hazardous to the fisherman. In particular, the fish may have sharp teeth in its mouth and sharp spines in its fins, and the fish hook will generally have a sharp barbed point. Consequently, needs arise means to easily and safely handle fish and fish hooks. Clubs, gaffs, and fish hook removers have been available for years to meet these needs, but a need still exists for simple and reliable devices for use in dispatching and landing fish, and removing hooks from them.

There is limited area in the marine environment of a boat and in the tackle boxes and containers used in storing fishing gear. Presently, separate tools are commonly needed for performing the functions of dispatching a fish and then landing the fish and removing the hook therefrom. For instance, a length of a rod, flat stock, or even a more advanced club as described in U.S. Pat. No. 5,348,296 to Frederiksen may be used to stun or kill the fish. A gaff consisting of a handle having a "U" shaped member at one end may assist the fisherman in supporting the weight of a fish when lifting the fish out of the water. And yet, another tool is used by the fisherman as means for gripping a fish hook and facilitating the removal thereof from the mouth or throat of a fish. These separate tools contribute to the using up of the valuable space available to the fisherman. Obviously, it would be advantageous to save valuable space and also not have the inconvenience of locating these various separate tools during fishing.

What is needed is a combination fishing accessory that is designed and to dispatch a fish as well as perform the subsequent function of removing a hook from the fish's throat or gaffing the fish. As will be seen, the present invention achieves its intended purposes, objectives and advantages by accomplishing the needs as identified above, through a new, useful and unobvious combination of elements.

SUMMARY OF THE INVENTION

An object, advantage, and feature of the present invention is to provide a novel tool and accessory for use by fishermen that is practical, versatile, and efficient in use that lends itself to the seemingly contradictory duties of dispatch, retrieval of a fish, and removal of a hook from the fish that is caught.

Another object is to provide a novel and improved construction of a fish club that is effective in the dispatch of a fish and provides in combination a hook extractor or gaff to provide a multifunction device that saves space and provides additional convenience. Therefore, the present device provides an elongate club with handle having a hook removing portion on the end opposing the handle that is especially adapted for gaffing a fish or for removing a hook from a fish's throat. The hook removing portion is shaped angularly to slide easily into a fish's throat and has a slot for receiving a line or hook and grabbing or engaging the hook firmly to remove the hook from the fish's throat. Backward barbs or slits on the hook removing portion may grab or engage a hook for extraction or be used to gaff the fish during retrieval. The combination provides a substantial improvement over existing practices by combining several functions into a single device and eliminating the inconvenience of storing a club, gaff, and hook removal tool separately and then locating each tool at the time needed.

For further understanding of the nature and objects of the invention, reference should be had to the following detailed description taken in conjunction with the accompanying drawings.

BRIEF DESCRIPTION OF THE DRAWINGS

Similar reference numerals refer to similar parts throughout the several views of the drawings.

DETAILED DESCRIPTION OF THE INVENTION

Figure 1:
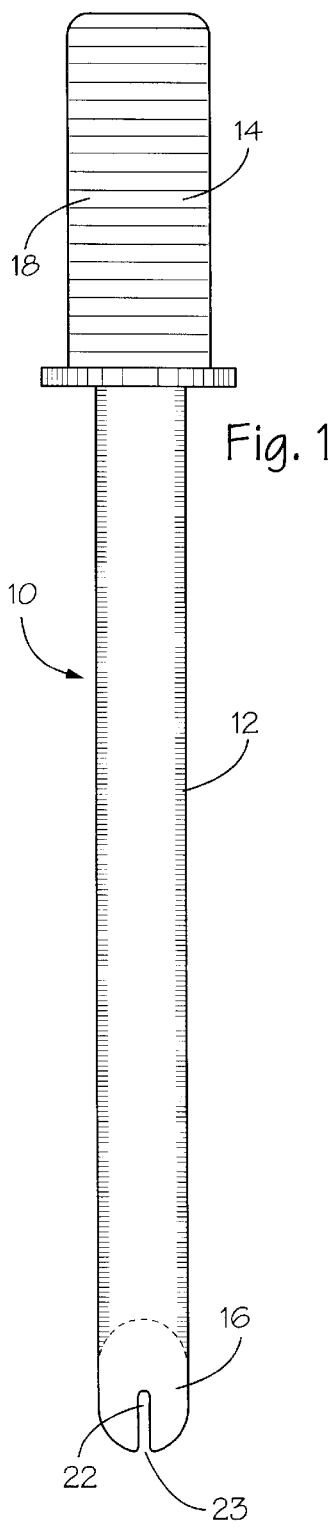
FIG. 1 is a front elevation view of the combination fishing accessory of the invention showing a fish club having an elongate rod with handle portion and angular tip with tool for extracting a hook or gaffing a fish.
Figure 2:
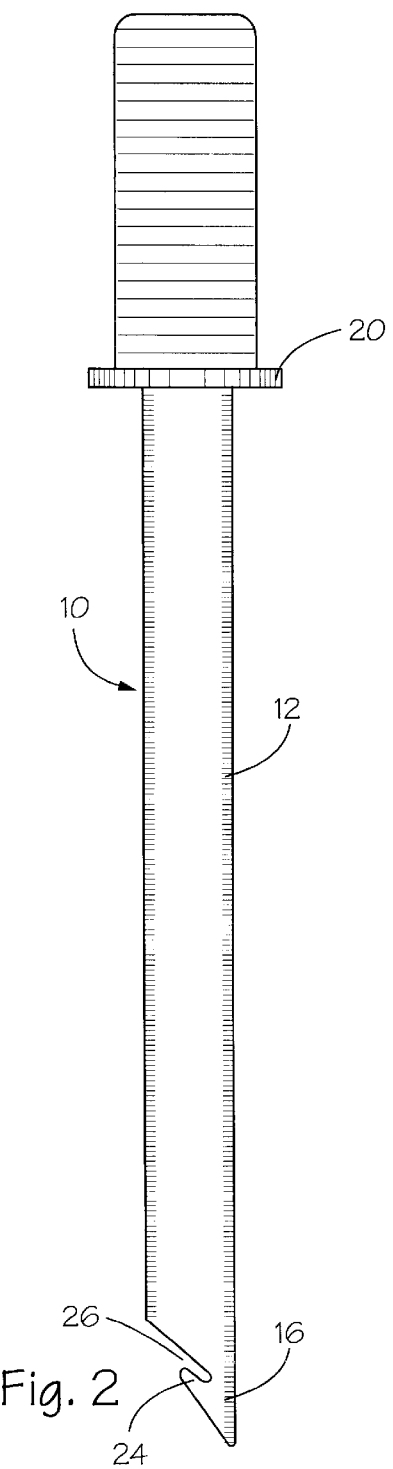
FIG. 2 is a first side elevation view of the combination fishing accessory of the invention showing one side illustrating a barbed or backward projecting grasping member formed in the angular tip of the device.
Figure 3:
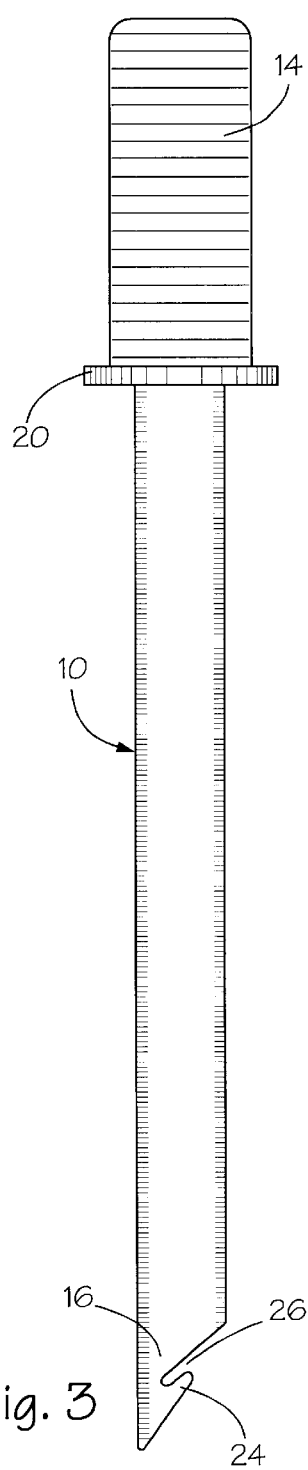
FIG. 3 is a second side elevation view of the combination fishing accessory showing from an additional side a backward projecting grasping member of the device.

Referring to the figures, there is shown a fishing accessory or fish club 10 comprising a rod 12, or relatively long, straight, rigid piece of metal or other solid material. The club includes a handle end having a handle portion 14 and includes a tool end opposite the handle end having an angular tip 16 that may also be used to remove a hook or to gaff a fish.

The rod 12 is an elongate member having a longitudinal axis terminating in a handle end and opposite tool end. The rod 12 is generally cylindrical as shown in the figures and preferably round in cross-section and at least one inch in diameter. However, the cross-section of the rod 12 may certainly vary to be ovoid or rectangular in shape or as otherwise desired within the spirit of the invention described herein. Because the accessory is used in salt water fishing, the rod 12 should be constructed of a corrosion resistant material that is rugged, strong, and durable. Potential materials for construction of the rod 12 include aluminum and other metals, plastic, fiberglass, or composites. Aluminum appears to be very desirable for construction of the rod 12 because of its corrosion resistant properties, strength, weight, and low cost. The rod 12 may be solid, hollow or tubular depending on the desired properties and quality of manufacture.

Usually, seventy to eighty percent of the length of the rod will extend from the handle portion 14, or, in other words, the rod will comprise seventy to eighty percent of the overall length of the club. The portion of the rod 12 extending from handle portion 14 must be of sufficient length and weight to stun or kill a fish when striking the fish with the rod 12. If the rod 12 is too light-weight or short, the desired effect of dispatching a fish to make it safe for handling will be too difficult to achieve without repeated pummeling of the fish. Rather, a single strike of the rod 12 on the fish should dispatch the fish so that the fish can be loaded onto a boat. Thus, the rod 12 provides a means for effectively dispatching a fish and avoiding the dangers associated with bringing a large active fish on board, while also making it easier to raise the fish over the side of the boat and avoid losing the fish due to its lashing about.

The handle portion 14 is located or attached to rod 12 on the handle end of the rod 12 and will generally comprise about twenty to thirty percent of the overall club length. Usually the handle portion 14 will be about 4 inches in length to accommodate a persons hand for swinging the club 10. The handle portion 12 may consist of a portion of the rod 12 on the handle end that is covered with a grip portion 18. Alternatively, the handle portion 14 could be separate attachment on the handle end of the rod 12.

Improvements may be made to the handle portion 14 to enhance performance. For instance, an aperture may be provided in the handle portion 14 to connect a wrist lanyard to the handle portion 14 to promote safety and prevent loss of the club by slipping during use. Further, the grip portion 18 may be covered with a non-slip material such as rubber to provide high friction and a surer grip. Likewise, ridges, dimples or other pattern may be used to enhance the user's grip on the handle portion 14. In addition, the handle portion 14 could be ergonomically enhanced and designed to specifically fit the fingers or hand of the user. Finally, the preferred handle portion 14 will have a guard member 20 to protect and shield the user's hand during use of the club. The guard member 20 may simply consist of a projection about the end of the handle portion 14 for the hand to rest against, such that the hand cannot slip forward into the spine or throat of a fish.

On the tool end of the rod 12 opposite the handle portion 14, the elongate rod 12 has an angular tip 16 that may also be used to remove a hook or to gaff a fish. The angular tip 16 is located at tip of elongate rod 12 and provides a hook removing portion on the rod 12 that is will usually represent about the last one to two inches of rod 12. In the embodiment shown in the figures, the angular tip is about 1.5 inches in length. The angular tip 16 is provided by cutting the tip of the rod 12 so that the edge of the rod 12 as shown in the figures defines a plane at the desired angle relative to the longitudinal axis of the rod. The angular tip 16 provides a reduced sized tip on the rod 12 that is advantageous to reach deeper into throat of a fish while removing a hook. As a further enhancement, the angular tip 16 of the rod 12 may be rounded to allow smooth snag-free operation when inserting the angular tip into the throat of a fish.

The angular tip 16 includes a receiving slot 22 for receiving a fishing line or a hook. The receiving slot 22 is formed in the angular tip 16 with an open edge 23 that opens toward the tool end of the elongate rod 12 to receive a fishing line or hook when the angular tip 16 is used to remove a hook. The receiving slot 22 may consist of an open ended slot of about 0.125 inch width and 0.625 inch length. Engaging the receiving slot 22, the rod 12 may be used to twist, push, or pull and extract the hook from the fish. A grasping portion is formed in the angular tip 16 with grasping members 24 oriented toward the handle end of the elongate rod 12. The grasping portion or grasping members 24 of the angular tip 16 may include diametrically opposing grasping members 24 as indicated in the figures. In lieu of members 24 formed by slots 26, barbs or the like with edges oriented backward toward the handle end of the rod 12 and formed in the angular tip 16 could be provided. Regardless, these grasping members 24 or barbs formed in the tapered side walls of the angular tip 16 provide edges on the angular tip 16, which are well situated for grabbing and holding a hook to extract the hook from the throat of a fish. Further, the grasping members 24 may be suitable for effective use in gaffing a fish and retrieving the fish into a boat.

While the embodiment shown includes a pair of grasping members 24, the angular tip 16 could be cut to provide a single grasping member or barb on one of the angular taper walls of the angular tip 16. In the embodiment shown, the pair of grasping members 24 are defined by the slots 26, which are about 0.125 inches in width. The grasping members 24 or slots 26 may be modified to be wider or longer. By modifying the grasping members 24 or slots 26, they could be made more desirable for gaffing a fish, but possibly less desirable for hook extraction. Therefore, design may be varied according to the certain tradeoffs between the functions of hook extraction and gaffing.

The overall length of the club 10 may be about sixteen inches, and the overall weight of the club 10 may be about twenty-two ounces to provide a useful length and weight for dispatching a fish, while still having an accessory that is easily stored in a marine environment such as a boat or tackle box. Of course, the length and weight may be varied according to the specific needs of the fisherman. Particular variations may be made for the type of fishing, the size of fish to be caught, the size of boat, or the size of tackle box.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention as defined by the claims.

I claim:

1. A combination fishing accessory comprising:
   a. an elongate rod having a longitudinal axis and having sufficient length and weight for striking and dispatching a fish and including a handle end and a tool end;
   b. a handle portion located on the handle end of the elongate rod;
   c. an angular tip located at the tool end of the elongate rod and including a pair of angularly tapered walls defining an angular plane relative to the longitudinal axis of the elongate rod;
   d. a receiving slot formed in the angular tip with an open end of the receiving slot oriented toward the tool end of the elongate rod; and
   e. a grasping portion formed in the angular tip including at least one grasping member formed in the angularly tapered walls and having a projecting edge oriented toward the handle end of the elongate rod.

2. A combination fishing accessory as in claim 1 in which the angular tip includes a pair of angularly tapered walls, and the grasping portion includes a pair of diametrically opposed grasping members formed in the angularly tapered walls, each grasping member having a projecting edge oriented toward the handle end of the elongate rod.

3. A combination fishing accessory as in claim 1 in which the total combined length of the elongate rod and handle portion is at least 16 inches in length and the total combined weight of the elongate rod and handle portion is at least 22 ounces.

4. A combination fishing accessory as in claim 1 in which the diameter of the elongate rod is at least one inch.

5. A combination fishing accessory for dispatching a fish and removing a hook from a fish comprising:
   a. an elongate rod having sufficient length and weight for striking and dispatching a fish and having a handle end and a tool end;
   b. a handle portion located on the handle end of the elongate rod;
   c. a angular tip located at the tool end of the elongate rod having a pair of angularly tapered walls;
   d. a receiving slot formed in the angular tip with an open end of the receiving slot oriented toward the tool end of the elongate rod; and
   e. a grasping portion including a pair of diametrically opposed grasping members formed in the angularly tapered walls, each grasping member having a projecting edge oriented toward the handle end of the elongate rod.

* * * * *